US009266528B2

(12) United States Patent
Raftry

(10) Patent No.: US 9,266,528 B2
(45) Date of Patent: Feb. 23, 2016

(54) CONTROL SYSTEM, VEHICLE AND METHOD OF CONTROLLING A VEHICLE

(75) Inventor: Andrew Raftry, Coventry (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 0 days.

(21) Appl. No.: 14/131,918

(22) PCT Filed: Jul. 11, 2012

(86) PCT No.: PCT/EP2012/063574
§ 371 (c)(1),
(2), (4) Date: May 2, 2014

(87) PCT Pub. No.: WO2013/007746
PCT Pub. Date: Jan. 17, 2013

(65) Prior Publication Data
US 2014/0244084 A1 Aug. 28, 2014

(30) Foreign Application Priority Data
Jul. 11, 2011 (GB) .................................. 1111798.3

(51) Int. Cl.
B60W 20/00 (2006.01)
B60W 10/02 (2006.01)
(Continued)

(52) U.S. Cl.
CPC .................. B60W 20/10 (2013.01); B60K 6/48 (2013.01); B60K 6/52 (2013.01); B60W 10/02 (2013.01);
(Continued)

(58) Field of Classification Search
CPC ..... B60W 10/00; B60W 10/04; B60W 10/06; B60W 10/08

USPC ......... 701/22, 70, 75, 79, 99–115, 30.3, 30.5, 701/30.6, 30.7, 30.8, 30.9, 31.1, 33.7
See application file for complete search history.

(56) References Cited

U.S. PATENT DOCUMENTS 4,849,891 A * 7/1989 Krohn et al. ..................... 701/89
5,009,279 A * 4/1991 Matsuda ......................... 180/197
(Continued)

FOREIGN PATENT DOCUMENTS

DE 102006018790 A1 10/2007
DE 102008000576 A1 9/2009
(Continued)

OTHER PUBLICATIONS

International Search Report for PCT Application No. PCT/EP2012/063574 mailed Nov. 10, 2012.
(Continued)

Primary Examiner — Thomas Tarcza
Assistant Examiner — Tyler J Lee
(74) Attorney, Agent, or Firm — Carlson, Gaskey & Olds

(57) ABSTRACT

The present invention relates to a control system for a vehicle (100), the system comprising: control means operable to monitor an accelerator control signal of the vehicle and to control a powertrain of the vehicle to apply an amount of torque to one or more wheels (111, 112, 114, 115) of the vehicle (100) corresponding to the accelerator control signal, the powertrain comprising prime mover means (121, 123); and means for determining whether the measured rate of acceleration of the vehicle and the accelerator control signal have an expected correspondence, wherein if the measured rate of acceleration and the accelerator control signal do not have the expected correspondence, the control means is operable to command a change in the amount of torque applied to the one or more wheels by the powertrain.

21 Claims, 4 Drawing Sheets

(51) Int. Cl.

| | | |
|---|---|---|
| *B60W 10/06* | (2006.01) | |
| *B60W 10/08* | (2006.01) | |
| *B60W 50/02* | (2012.01) | |
| *B60W 50/029* | (2012.01) | |
| *B60W 50/038* | (2012.01) | |
| *B60K 6/48* | (2007.10) | |
| *B60K 6/52* | (2007.10) | |
| *B60W 40/107* | (2012.01) | |

(52) U.S. Cl.
CPC ............... *B60W 10/06* (2013.01); *B60W 10/08* (2013.01); *B60W 20/00* (2013.01); *B60W 50/0205* (2013.01); *B60W 50/029* (2013.01); *B60W 50/038* (2013.01); *B60K 2006/4825* (2013.01); *B60W 20/40* (2013.01); *B60W 20/50* (2013.01); *B60W 40/107* (2013.01); *B60W 2510/0241* (2013.01); *B60W 2520/105* (2013.01); *B60W 2520/14* (2013.01); *B60W 2540/10* (2013.01); *B60W 2550/406* (2013.01); *B60W 2710/0666* (2013.01); *B60W 2710/083* (2013.01); *B60W 2710/105* (2013.01); *B60W 2720/30* (2013.01); *Y02T 10/6221* (2013.01); *Y02T 10/6252* (2013.01); *Y02T 10/6265* (2013.01); *Y02T 10/6286* (2013.01); *Y02T 10/7258* (2013.01)

(56) References Cited

U.S. PATENT DOCUMENTS

| | | | | |
|---|---|---|---|---|
| 5,212,640 | A * | 5/1993 | Matsuda | 701/29.2 |
| 6,123,163 | A * | 9/2000 | Otsu et al. | 180/65.8 |
| 7,966,113 | B2 * | 6/2011 | Kroehnert et al. | 701/41 |
| 8,261,864 | B2 * | 9/2012 | Bhattarai et al. | 180/65.285 |
| 2001/0029419 | A1 * | 10/2001 | Matsumoto et al. | 701/80 |
| 2002/0029913 | A1 | 3/2002 | Ito et al. | |
| 2002/0087252 | A1 | 7/2002 | Shimizu et al. | |
| 2004/0055799 | A1 * | 3/2004 | Atarashi et al. | 180/65.2 |
| 2005/0143877 | A1 * | 6/2005 | Cikanek et al. | 701/22 |
| 2007/0050112 | A1 * | 3/2007 | Kroehnert et al. | 701/41 |
| 2009/0248268 | A1 * | 10/2009 | Shigeta et al. | 701/72 |
| 2011/0208402 | A1 * | 8/2011 | Sladek, Jr. | 701/102 |
| 2012/0158257 | A1 * | 6/2012 | Stursa et al. | 701/52 |

FOREIGN PATENT DOCUMENTS

| | | |
|---|---|---|
| EP | 0748959 A2 | 12/1996 |
| EP | 1052132 A2 | 11/2000 |
| JP | H0885373 A | 4/1996 |
| JP | H10248106 A | 9/1998 |
| JP | 2002218605 A | 8/2002 |
| JP | 2002365085 A | 12/2002 |
| JP | 2003267698 A | 9/2003 |
| JP | 2004009815 A | 1/2004 |
| JP | 2004096939 A | 3/2004 |
| JP | 2007055493 A | 3/2007 |
| JP | 2007057066 A | 3/2007 |
| JP | 2008120268 A | 5/2008 |
| KR | 20110035693 A | 4/2011 |

OTHER PUBLICATIONS

Combined Search and Examination Report under Sections 17 and 18(3) for Application No. GB1111798.3 dated Nov. 14, 2011.

* cited by examiner

CONTROL SYSTEM, VEHICLE AND METHOD OF CONTROLLING A VEHICLE

FIELD OF THE INVENTION

The present invention relates to apparatus and a method for controlling a vehicle. In particular but not exclusively the invention relates to an apparatus and a method of detecting whether a vehicle is responding correctly to driver control commands. Aspects of the invention relate to an apparatus, to a method and to a vehicle.

BACKGROUND

It is known to provide a controller for a motor vehicle arranged to check that an amount of torque developed by an engine of the vehicle corresponds to the amount of torque demanded by a driver of the vehicle. In the event that a discrepancy is identified the controller may be arranged to reduce the amount of torque developed by the engine.

In known vehicles, the amount of torque developed by the engine is typically measured by reference to engine speed and a flow rate into the engine of either air (in the case of petrol engines) or fuel (in the case of diesel engines). The values of engine speed and flow rate are then processed by a controller to determine the amount of torque being developed. This methodology for measuring torque has been found to be cheaper and more reliable than introducing a direct means for measuring torque such as a strain gauge on a crankshaft of the engine.

With the advent of hybrid electric vehicles (HEVs) having a plurality of prime movers including an engine and an electric machine, it has become necessary to measure the torque produced by each of the prime movers in order to determine whether the amount of torque developed by the vehicle corresponds to that demanded by the driver.

STATEMENT OF THE INVENTION

Aspects of the invention relate to an apparatus, to a system, to a method and to a vehicle as claimed in the appended claims.

According to one aspect of the invention for which protection is sought there is provided a control system for a vehicle, the system comprising:
  control means operable to monitor an accelerator control signal of the vehicle and to control a powertrain of the vehicle to apply an amount of torque to one or more wheels of the vehicle corresponding to the accelerator control signal, the powertrain comprising prime mover means; and
  means for determining whether the measured rate of acceleration of the vehicle and the accelerator control signal have an expected correspondence,
  wherein if the measured rate of acceleration and the accelerator control signal do not have the expected correspondence, the control means is operable to command a change in the amount of torque applied to the one or more wheels by the powertrain.

Embodiments of the invention have the advantage that the rate of acceleration of the vehicle is measured rather than the amount of torque in order to determine whether a powertrain of a vehicle is delivering a correct (expected) amount of torque to drive a vehicle. The rate of acceleration is measured directly and not inferred from other measurements. This is in contrast to known vehicles in which measurements of the amount of torque developed by an engine of the vehicle are made that involve a calculation based on measurement of a flow rate of fluid (air or diesel fuel) into the engine and a speed of the engine. A value of expected acceleration of the vehicle is then determined responsive to the calculated value of torque developed by the engine.

In some embodiments the monitoring means may be operable to command the change in the amount of torque applied to the one or more wheels by the powertrain. The monitoring means may be separate from the control means such that the monitoring means may continue to function correctly even in the event of a malfunction by the control means.

The amount of torque required to be provided for a given accelerator control signal may be further dependent on a speed of the vehicle. Thus the control system may be arranged to determine the amount of torque the powertrain is to apply corresponding to the accelerator control signal further responsive to a speed of the vehicle.

Optionally the control system is arranged to determine the amount of torque corresponding to the accelerator control signal further responsive to a speed of at least a portion of the powertrain, optionally a speed of the prime mover means of the powertrain. Thus the control system may be arranged to determine the amount of torque corresponding to a given accelerator control signal taking into account the speed of the at least a portion of the powertrain.

Where the prime mover means comprises a plurality of prime mover systems such as an engine and an electric propulsion motor the speed employed by the control system to determine torque may be responsive to a speed of the engine or the electric motor or both. In some embodiments if the engine is switched off the control system may employ a virtual engine speed to determine torque, the virtual engine speed being a speed at which the engine would be rotating if the engine were switched on and drivably connected to the wheels of the vehicle.

Advantageously the control system may be operable to change the amount of torque applied to one or more wheels of the vehicle by commanding a change in the amount of torque developed by the prime mover means.

Further advantageously the control system may be operable to change the amount of torque applied to the one or more wheels of the vehicle by commanding a change to an amount of brake force imposed on one or more wheels. Braking may be applied electrically, via an electric machine operating as a generator. For example in some embodiments a crankshaft integrated motor/generator may be provided, or any other suitable electric machine. In some embodiments one or more electric machines mounted in or near one or more wheels, for example electric machines integrated into each wheel, may be employed to provide 'electric braking' or retardation of a vehicle. Alternatively or in addition braking may be applied by means of a friction foundation braking system.

Advantageously, if the measured rate of acceleration corresponds to a value higher than that expected for the accelerator control signal the powertrain is operable to command a reduction in the amount of torque applied to the one or more wheels by the powertrain.

Reference to reducing the amount of torque applied to the one or more wheels by the powertrain is to be understood to mean, for example, reducing the amount of torque in order to prevent the speed of the vehicle increasing due to an excess of torque provided by the at least one prime mover.

In some arrangements this may be implemented by the control system by commanding the powertrain to reduce an amount of torque developed by the prime mover means. In some embodiments the prime mover means may be operable to apply a negative torque to the wheels. In the case of an internal combustion engine this may be accomplished by compression or overrun braking. In the case of an electric propulsion motor this may be accomplished by operating the motor as a generator.

It is to be understood that for the purposes of the present application a negative torque is considered to be a lower torque than a positive torque even if the magnitude of the negative torque is greater than the magnitude of the positive torque.

In some embodiments the control system may be operable to command the powertrain to reduce the amount of torque applied to the one or more wheels by applying one or more brakes in addition to or instead of reducing the amount of torque generated by the prime mover means.

In some embodiments the control system may be operable to command a reduction in the amount of torque applied to the one or more wheels of the vehicle by commanding disconnection of the prime mover means from the one or more wheels or commanding a slip of clutch means between the prime mover means and the one or more wheels.

The control system may be operable to reduce the amount of torque applied to the one or more wheels of the vehicle by commanding disconnection of the prime mover means from the one or more wheels.

Disconnection of the prime mover means has the advantage that a vehicle may be permitted to coast (and be slowed by driver-initiated braking if required) in the event that unintended acceleration is encountered.

The control system may be operable to command a reduction in the amount of torque applied to one or more wheels of the vehicle by commanding the powertrain to turn off the at least one prime mover means.

Optionally the control system may be arranged wherein if the measured rate of acceleration corresponds to a value lower than that expected for the value of accelerator control signal the control system is operable to command an increase in the amount of torque applied to the one or more wheels by the powertrain.

This feature may be particularly advantageous in circumstances where control means fails to command sufficient torque in circumstances where torque is urgently required by a driver, for example whilst turning at a junction and accelerating to join a flow of moving traffic.

Optionally the prime mover means comprises one prime mover system or a plurality of prime mover systems.

By prime mover system is included an engine such as an internal combustion engine, an electric propulsion motor or any other suitable prime mover.

In embodiments of the invention having an engine and an electric machine operable as a generator or as a propulsion motor (such as in a hybrid electric vehicle) the control system may be operable to turn off and/or disconnect the engine from wheels of the vehicle and apply a negative torque to the wheels by means of the electric machine in order to reduce an amount of torque applied to the one or more wheels.

Embodiments of the invention have the advantage that in vehicles having a plurality of prime mover systems, it is not required to provide a corresponding plurality of torque measuring means for measuring the amount of torque generated by each of the prime mover systems. Rather, a separate independent means for verifying that the prime mover systems are generating the required amount of torque is provided, i.e. a measurement of rate of acceleration of the vehicle.

Advantageously the means for measuring the rate of acceleration of the vehicle may be independent of the control system, the means for measuring rate of acceleration being arranged to provide an output to the control system corresponding to the measured rate of acceleration. Thus in some embodiments the measured rate of acceleration of the vehicle may be provided to the control system from an external source.

The control system may be required to perform processing of a signal from the means for measuring rate of acceleration, for example signal processing such as noise filtering, signal averaging or any other suitable signal processing methodology in order to obtain a measurement of acceleration.

The feature that the means for measuring the rate of acceleration is independent of the control system has the advantage that in the event of a malfunction of the control system whereby an actual amount of torque developed by the powertrain exceeds the amount of torque demanded by the driver, a risk that the control system fails to detect the malfunction and therefore fails to take action in response may be reduced. This is at least in part because a risk that that data in respect of measured rate of acceleration is corrupted or unavailable due to a control system malfunction may be reduced.

In some embodiments the means for determining whether the measured rate of acceleration of the vehicle and the accelerator control signal have an expected correspondence may be implemented in separate hardware from the control means that monitors the accelerator control signal and controls the powertrain to apply an amount of torque to one or more wheels corresponding to the accelerator control signal. This reduces a risk that if the control means monitoring the accelerator control signal becomes corrupted, the means for determining whether the expected corresponds exists is not likely to be corrupted as a consequence.

Alternatively the control system may comprise means for measuring rate of acceleration of the vehicle.

Advantageously the means for measuring the rate of acceleration of the vehicle may comprise an accelerometer. Alternatively or in addition the means for measuring rate of acceleration may be or include a position measurement system such as a Global Positioning System (GPS) system or any other suitable system such as a General Packet Radio Service (GPRS) cellular communications network system. It is to be understood that an accelerometer device is expected to provide a more responsive measurement of acceleration than GPS or GPRS systems using currently available technology.

The measured rate of acceleration of the vehicle may be a rate parallel to the direction of travel of the vehicle. That is, the measured rate of acceleration may be a rate of longitudinal acceleration.

Advantageously the control system may be operable to determine whether the accelerator control signal corresponds to the measured rate of acceleration in the direction parallel to the direction of travel by taking into account vehicle attitude thereby to compensate for an effect of gravity on vehicle acceleration when the vehicle is on an inclined surface.

By attitude is meant an angle of pitch of the vehicle. Thus, if the vehicle is on a substantially horizontal surface the pitch will correspond to a 'level attitude' or substantially zero pitch. If the vehicle is facing uphill on an incline, the angle of pitch will be positive, corresponding to a positive vehicle attitude, i.e. a front portion of the vehicle is raised.

Optionally the control system is operable to determine whether the accelerator control signal corresponds to the measured rate of acceleration by taking into account a yaw rate of the vehicle.

Advantageously the accelerator control signal may be provided according to a position of one selected from amongst a driver operated foot pedal and a hand-operated control.

Optionally the vehicle comprises a cruise control system operable to provide the accelerator control signal.

The control system may comprise a cruise control system operable to provide the accelerator control signal.

According to another aspect of the invention for which protection is sought there is provided a vehicle having a control system as set out in one or more of the preceding paragraphs.

According to another aspect of the invention for which protection is sought there is provided a method of controlling a vehicle comprising: monitoring by control means an accelerator control signal of the vehicle and controlling by the control means a powertrain of the vehicle having prime mover means to apply an amount of torque to one or more wheels of the vehicle corresponding to the accelerator control signal; and determining whether the measured rate of acceleration of the vehicle and the accelerator control signal have an expected correspondence, whereby if the measured rate of acceleration and the accelerator control signal do not have the expected correspondence, the method comprising commanding by means of the control means a change in the amount of torque applied to the one or more wheels by the powertrain.

According to yet another aspect of the invention for which protection is sought there is provided a vehicle comprising: at least one prime mover; and control means operable to monitor an accelerator control signal of the vehicle and to control the at least one prime mover to develop an amount of torque corresponding to the accelerator control signal, the vehicle further comprising means for measuring a rate of acceleration of the vehicle and determining whether the measured rate of acceleration of the vehicle corresponds to the accelerator control signal, in the event that the measured rate of acceleration corresponds to a higher rate of acceleration the vehicle being arranged to reduce the amount of torque applied to one or more wheels of the vehicle.

According to a further aspect of the invention for which protection is sought there is provided a control system for a vehicle, the system comprising: control means operable to monitor an accelerator control signal of the vehicle and to control a powertrain of the vehicle to apply an amount of torque to one or more wheels of the vehicle corresponding to a value of the accelerator control signal; and means for determining whether a measured rate of acceleration of the vehicle corresponds to that expected for the value of accelerator control signal, wherein if the measured rate of acceleration corresponds to a higher rate of acceleration than the expected acceleration, the control means is operable to command a reduction in the amount of torque applied to one or more wheels of the vehicle by the powertrain.

According to a still further aspect of the invention for which protection is sought there is provided a method of controlling a vehicle comprising the steps of: monitoring an accelerator control signal of the vehicle; control at least one prime mover of the vehicle to develop an amount of torque corresponding to the accelerator control signal, measuring a rate of acceleration of the vehicle; and determining whether the accelerator control signal corresponds to the measured rate of acceleration of the vehicle; in the event that the measured rate of acceleration corresponds to a higher rate of acceleration the method comprising reducing the amount of torque applied to one or more wheels of the vehicle.

According to another aspect of the invention for which protection is sought there is provided a control system for a vehicle, the system comprising control means operable to monitor an accelerator control signal of a vehicle and a rate of acceleration of a vehicle, the control means being operable to determine whether the rate of acceleration of a vehicle and the accelerator control signal have an expected correspondence, wherein if the rate of acceleration and the accelerator control signal do not have the expected correspondence, the control system is operable to command a change in an amount of torque applied to the one or more wheels by a powertrain.

Within the scope of this application it is envisaged that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments, unless there is incompatibility of features.

BRIEF DESCRIPTION OF THE DRAWINGS

Embodiments of the invention will now be described, by way of example only, with reference to the accompanying figures in which.

DETAILED DESCRIPTION

Embodiments of the invention are particularly suited to hybrid electric vehicles although it is to be understood that the invention is not limited to a hybrid electric vehicle. For example embodiments of the invention may be useful in a non-hybrid vehicle such as an electric vehicle not having an internal combustion engine. Alternatively embodiments of the invention may be used in a conventional vehicle having only a fuel-fired actuator such as an internal combustion engine, a gas turbine engine or any other suitable engine.

Figure 1:
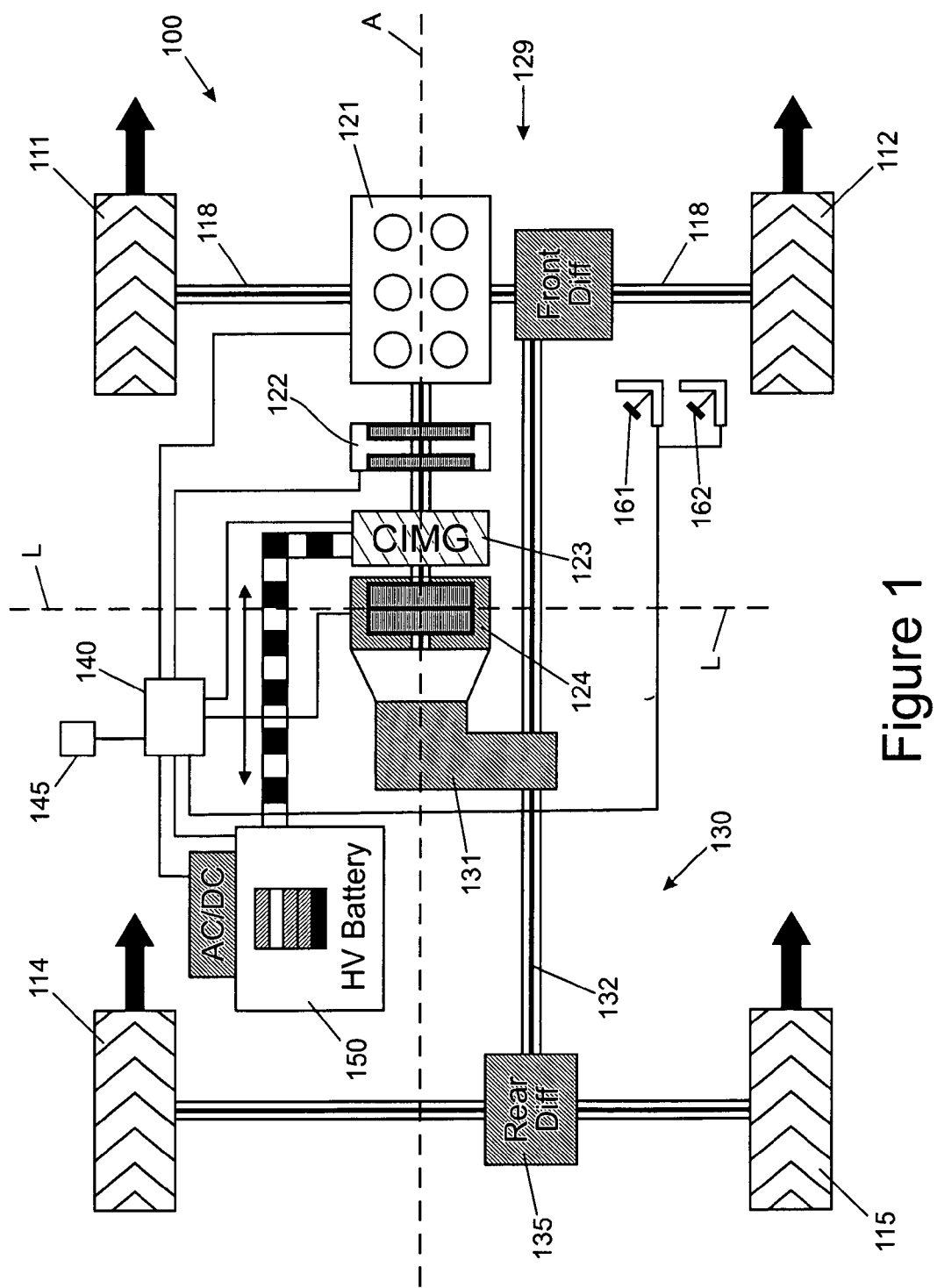
FIG. 1 is a schematic illustration of a vehicle according to an embodiment of the invention.

FIG. 1 shows a hybrid electric vehicle (HEV) 100 according to an embodiment of the present invention. The HEV 100 has a powertrain 129 that includes an internal combustion engine 121 releasably coupled to a crankshaft integrated motor/generator (CIMG) 123 by means of a clutch 122. The CIMG 123 is in turn coupled to an automatic transmission 124 of the powertrain 129. The transmission 124 is arranged to drive a pair of front wheels 111, 112 of the powertrain 129 by means of a pair of front drive shafts 118. The powertrain 129 also has an auxiliary driveline 130 arranged to drive a pair of rear wheels 114, 115 by means of an auxiliary driveshaft 132 and a rear differential 135.

A battery 150 is provided that may be coupled to the CIMG 123 in order to allow the CIMG 123 to generate torque when the CIMG 123 is operated as a motor. Alternatively the battery 150 may be coupled to the CIMG 123 to receive charge from the CIMG 123 when the CIMG 123 is operated as a generator in order to recharge the battery 150.

The powertrain 129 is configured to operate in a parallel mode or an electric vehicle (EV) mode.

In the parallel mode of operation the clutch 122 is closed and the engine 121 is arranged to provide torque to the transmission 124 in a substantially direct coupling through the CIMG 123. In this mode the CIMG 123 may be operated either as a motor or as a generator. The CIMG 123 may be operated as a motor in order to 'boost' the torque delivered to the transmission 124; this may be referred to as a 'parallel boost' mode of operation. The CIMG 123 may alternatively be operated as a generator to generate charge to charge the battery 150. If the CIMG 123 is operated as a generator to recharge the battery 150 whilst the engine 121 is delivering torque to the transmission 124 the vehicle 100 may be said to be operating in a 'parallel recharge' mode. It is to be understood that the CIMG 123 applies a negative torque loading on the engine 121 in order to generate charge to charge the battery 150.

In the EV mode of operation the clutch 122 is opened and the engine 121 is turned off. Again, the CIMG 123 is then operated either as a motor or as a generator. It is to be understood that the CIMG 123 may be arranged to act as a generator in EV mode in order to effect regenerative braking of the vehicle 100.

The vehicle 100 has an accelerator pedal 162 by means of which the driver may demand a required amount of torque to drive the vehicle 100. A controller 140 controls the vehicle 100 to provide the demanded torque from the engine 121 and/or CIMG 123 according to an energy management program (EMP) executed by the controller 140.

A brake pedal 161 is provided by means of which the driver may apply negative torque to the wheels 111-115. The negative torque may be provided by a regenerative braking arrangement in which the CIMG 123 applies a negative torque to the wheels when required.

If the amount of regenerative braking available from the CIMG 123 is insufficient to meet the driver demanded brake torque the powertrain 129 is operable to deploy friction brakes to slow the vehicle 100.

The controller 140 is arranged to monitor the amount of torque demanded by the driver by reference to a position of the accelerator pedal 162 and to verify that the amount of torque developed by the engine 121 and CIMG 123 corresponds to the driver demanded value.

Figure 2:
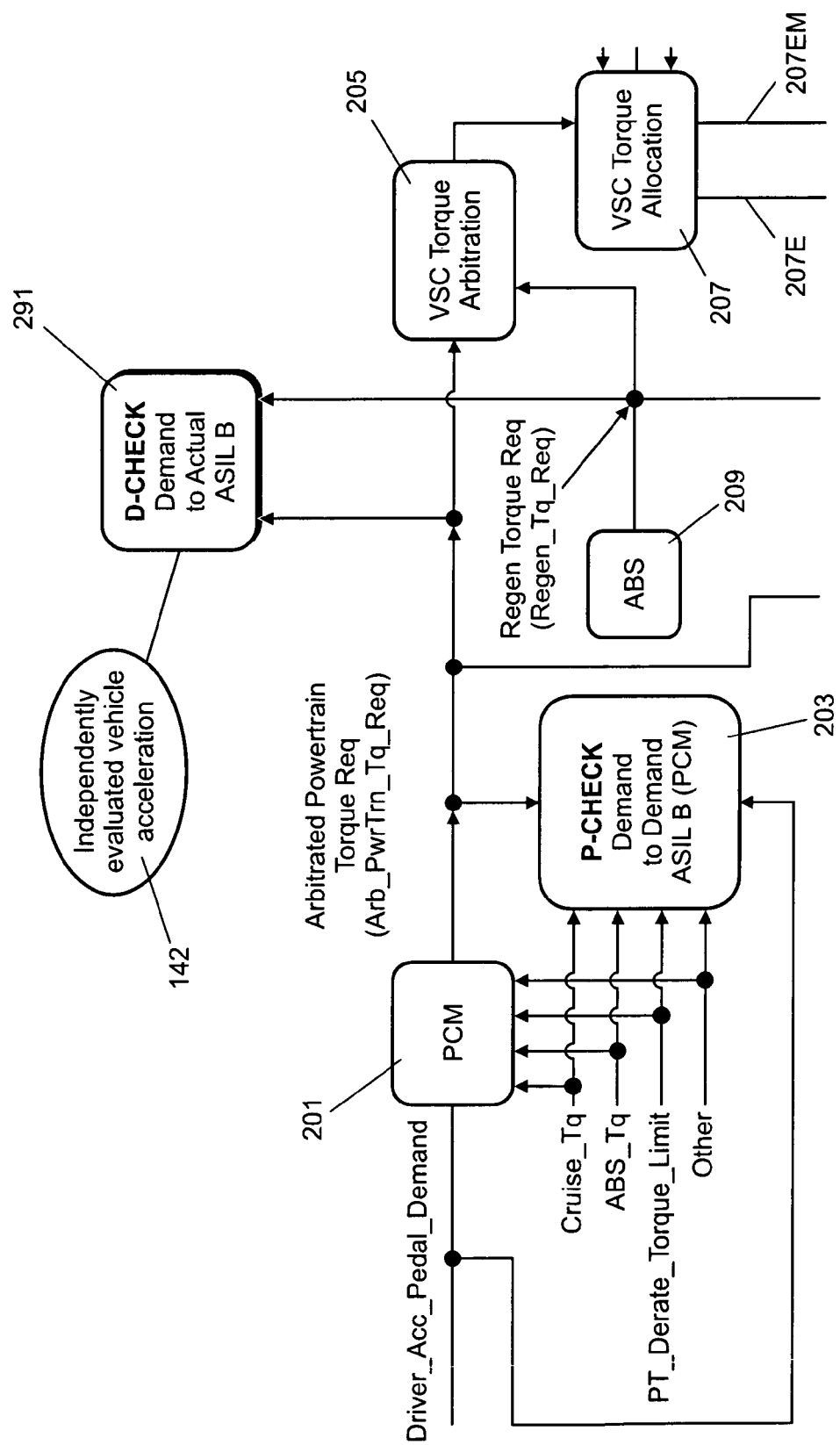
FIG. 2 is a schematic illustration of a flow of control signals in the vehicle of FIG. 1.

FIG. 2 is a control flow diagram of a portion of a control architecture of the vehicle 100.

A powertrain control module (PCM) 201 of the vehicle 100 is provided with an input signal Driver_Acc_Pedal_Demand corresponding to the amount by which the accelerator pedal 162 of the vehicle 100 has been depressed by the driver. It is to be understood that this signal corresponds to the value of torque that the driver is demanding the vehicle 100 to produce in order to propel the vehicle 100.

The PCM 201 also receives a cruise control system (CCS) torque request signal, Cruise_Tq, an anti-lock braking system (ABS) signal, ABS_Tq, and a powertrain derate torque limit signal PT_Derate_Torque_Limit. In some embodiments the PCM 201 may be arranged to receive one or more other signals in addition as indicated by input line 'other'.

The Cruise_Tq signal provides an indication of an amount of torque demanded by the cruise control system. The ABS_Tq signal provides an indication of the amount of requested torque increase or reduction to control wheel speeds to avoid wheel spin or wheel locking. Responsive to this signal, the PCM 201 may apply a positive torque to one or more wheels of the vehicle 100 in order to spin up a wheel that is stationary or rotating too slowly in order to reduce slip or apply torque reduction to reduce spin. However this signal is not intended to result in a vehicle response, i.e. a change in rate of acceleration or speed of the vehicle.

The PT_Derate_Torque_Limit signal provides an indication of a limit of the total amount of torque that may be provided by the engine 121 and CIMG 123. It is to be understood that the total amount of torque that may be provided by one or both of the engine 121 and CIMG 123 may be reduced under certain circumstances. For example the transmission 124 may request a torque limit due to a fault with the transmission 124. Furthermore, if the CIMG 123 is at a temperature above a certain threshold temperature the vehicle 100 may be arranged to limit the amount of torque that may be demanded of the CIMG 123 in order to prevent damage to and/or premature ageing of the CIMG 123. Consequently, the balance of demanded torque that would otherwise be provided by the CIMG 123 is provided by the engine 121 provided the engine 121 is able to deliver this amount.

The PCM 201 outputs an arbitrated value of a powertrain torque request signal Arb_PwrTrn_Tq_Req responsive to the input signals. The arbitrated value corresponds to the actual value of torque required to be provided by the powertrain 229 in response to the signals input to the PCM 201. That is, the total amount of torque that is to be provided by the engine 121 and/or CIMG 123. The arbitrated value Arb_PwrTrn_Tq_Req is provided to a P-Check function block 203, a VSC torque arbitration function block 205 and a D-Check function block 291.

The P-Check function block 203 is implemented by the controller 140. The P-Check function block 203 receives the signals input to the PCM noted above including the Driver_Acc_Pedal_Demand signal, Cruise Tq signal, ABS_Tq signal and PT_Derate_Torque_Limit signal.

If the vehicle is operating in cruise control mode the P-Check function block 203 determines whether the value of Arb_PwrTrn_Tq_Req corresponds to the value of torque requested by the cruise control system taking into account the values of the other signals input to the PCM 201 and block 203. If the vehicle is not operating in cruise control mode the P-Check function block 203 determines whether the value of Arb_PwrTrn_Tq_Req corresponds to the value of torque demanded by the driver, i.e. the value corresponding to the Driver_Acc_Pedal_Demand signal, taking into account the values of the other signals input thereto.

If the value of Arb_PwrTrn_Tq_Req exceed the expected value, the P-Check function block 203 is arranged to limit the amount of torque developed by the engine 121 and CIMG 123. In some arrangements, if the value of Arb_PwrTrn_Tq_Req exceeds any of these values the engine 121 and CIMG 123 are shut down. In addition or instead, in some embodiments the P-check function block 203 may be configured to force a reset of the controller 140.

In some embodiments the P-Check function block 203 is arranged to limit the amount of positive torque transmitted from the engine 121 and/or CIMG 123 to one or more wheels of the vehicle 100, for example by slippage of one or more clutches of the powertrain 129.

Similarly, the P-Check function block 203 also checks that the value of Arb_PwrTrn_Tq_Req does not exceed any constraint imposed by the PT_Derate_Torque_Limit signal.

As noted above, in the embodiment shown, ABS controller 209 provides a brake torque request signal Regen_Tq_Req (which may be referred to as an 'electric brake torque' request) to the VSC torque arbitration function block 205 and the D-Check function block 291. The signal provided by the ABS controller 209 is a retardation torque request being an amount of negative torque to be applied by the powertrain 120 by means of the CIMG 123. Other arrangements are also useful.

The VSC torque arbitration function block 205 compares the value of the arbitrated powertrain torque request signal Arb_PwrTrn_Tq_Req with the value of the Regen_Tq_Req signal and determines a total amount of torque that is to be demanded from the engine 121 and/or CIMG 123, depending on whether one or both of the engine 121 and CIMG 123 are to provide torque. A decision as to which of the engine 121 and CIMG 123 are to provide torque and the amount of torque each is to provide is made by a VSC torque allocation function block 207. The VSC torque allocation function block 207 provides an output 207E corresponding to the amount of torque to be developed by the engine 121 and an output 207EM corresponding to an amount of torque to be developed by the CIMG 123.

It is to be understood that the VSC 205 determines the amount of torque required of the engine 121 and CIMG 123 respectively in order to deliver the arbitrated powertrain torque request taking into account signal Regen_Tq_Req from the ABS controller 209 (see below). In other words, the VSC 205 determines the amounts of torque to be provided by the engine 121 and CIMG 123 taking into account driver demand, cruise torque demand and any transient torque requests used to control wheel speeds or derate the powertrain output. As noted above, derating of the powertrain output may take into account any limitations placed on the amount of torque that the CIMG 123 or engine 121 may deliver at a given moment in time.

It is to be further understood that the VSC 205 may apply a negative torque request to the CIMG 123 in response to a request by ABS controller 209 via signal Regen_Tq_Req. Such a request may be issued for example if the ABS controller 209 determines that the driver brake pedal 161 is depressed and vehicle retardation is requested by the driver. Vehicle retardation can be achieved by applying negative torque by means of the CIMG 123 as an alternative to (or in addition to) the use of friction braking.

The D-Check function block 291 is implemented in a module separate from the controller 140 and PCM 201. The D-check function block 291 is arranged to receive an input signal from an accelerometer device 142 that is arranged to measure a proper acceleration of the device 142 and therefore of the vehicle 100. The accelerometer device 142 may be a gyroscopic-type accelerometer device, a piezoelectric-type accelerometer device, a micro-electromechanical system (MEMS)-type device or any other suitable accelerometer device 142.

The D-Check function block 291 is arranged to calculate a desired (or expected) acceleration of the vehicle responsive to the values of the arbitrated powertrain torque request signal Arb_PwrTrn_Tq_Req and Regen_Tq_Req signal. The D-Check function block 291 also determines an actual forward acceleration of the vehicle 100 by correcting the value of acceleration provided by the accelerometer device 142 by reference to one or more signals indicating vehicle attitude and yaw rate. Thus, the D-Check function block 291 takes into account vehicle attitude in determining expected acceleration.

It is to be understood that the expected value of vehicle acceleration for a given powertrain torque will depend at least in part on a gradient of a surface on which the vehicle 100 is driving, for example whether the vehicle 100 is ascending or descending a slope, or traveling on a relatively flat surface.

The signal ABS_Tq is communicated to the D-check function block 291 in order to reduce the driver acceleration request understanding to a negative value when required.

The D-Check function block 291 compares the expected value of acceleration with the value of forward acceleration determined responsive to the signal received from the accelerometer device 142 in order to determine whether the actual acceleration of the vehicle 100 corresponds to the expected value.

For example, if the value of Arb_PwrTrn_Tq_Req corresponds to a torque of 300 Nm and the value of Regen_Tq_Req corresponds to a torque of 100 Nm, the net positive torque provided by the engine 121 will be 200 Nm. The D-Check function block 291 is therefore arranged to calculate a desired or expected acceleration of the vehicle 100 based on a net torque of 200 Nm from the powertrain, taking into account the transmission gear ratio to determine the torque being applied to the wheels. It is to be understood that the 100 Nm of regenerative torque is a torque loading placed on the engine 121 by the CIMG 123 in order to generate electrical power to charge the battery 150.

If the acceleration measured responsive to the signal received from the accelerometer device 142 is greater than that which would be expected based on the value of Arb_PwrTrn_Tq_Req and Regen_Tq_Req the D-Check function block 291 is arranged to provide an alert signal to reduce the amount of torque developed by the engine 121 and/or CIMG 123. In some embodiments the D-Check function block 291 is arranged to reduce the amount of torque generated by the engine 121 and CIMG 123 to zero and to disconnect the engine 121 and CIMG 123 from the wheels of the vehicle 100.

In some embodiments the D-Check function block 291 is arranged to place the engine 121 and CIMG 123 in a condition in which they cannot generate torque. In some embodiments the D-Check function block 291 is arranged to disable the engine 121 and CIMG 123 such that they cannot be operated. Other actions are also useful.

Embodiments of the present invention have the advantage that if a value of actual acceleration of the vehicle 100 exceeds that which would be expected based on the value of Arb_PwrTrn_Tq_Req and Regen_Tq_Req the vehicle 100 reduces the amount of torque applied to driven wheels in order to reduce a risk of driver inconvenience. Embodiments of the invention have the advantage that an independent and direct check of vehicle acceleration may be performed independently of any indirect measurements of an amount of torque developed by one or more prime movers of the vehicle 100 in order to verify that the vehicle 100 is responding as expected to accelerator control input (whether directly from the driver or from a cruise control system).

Figure 3:
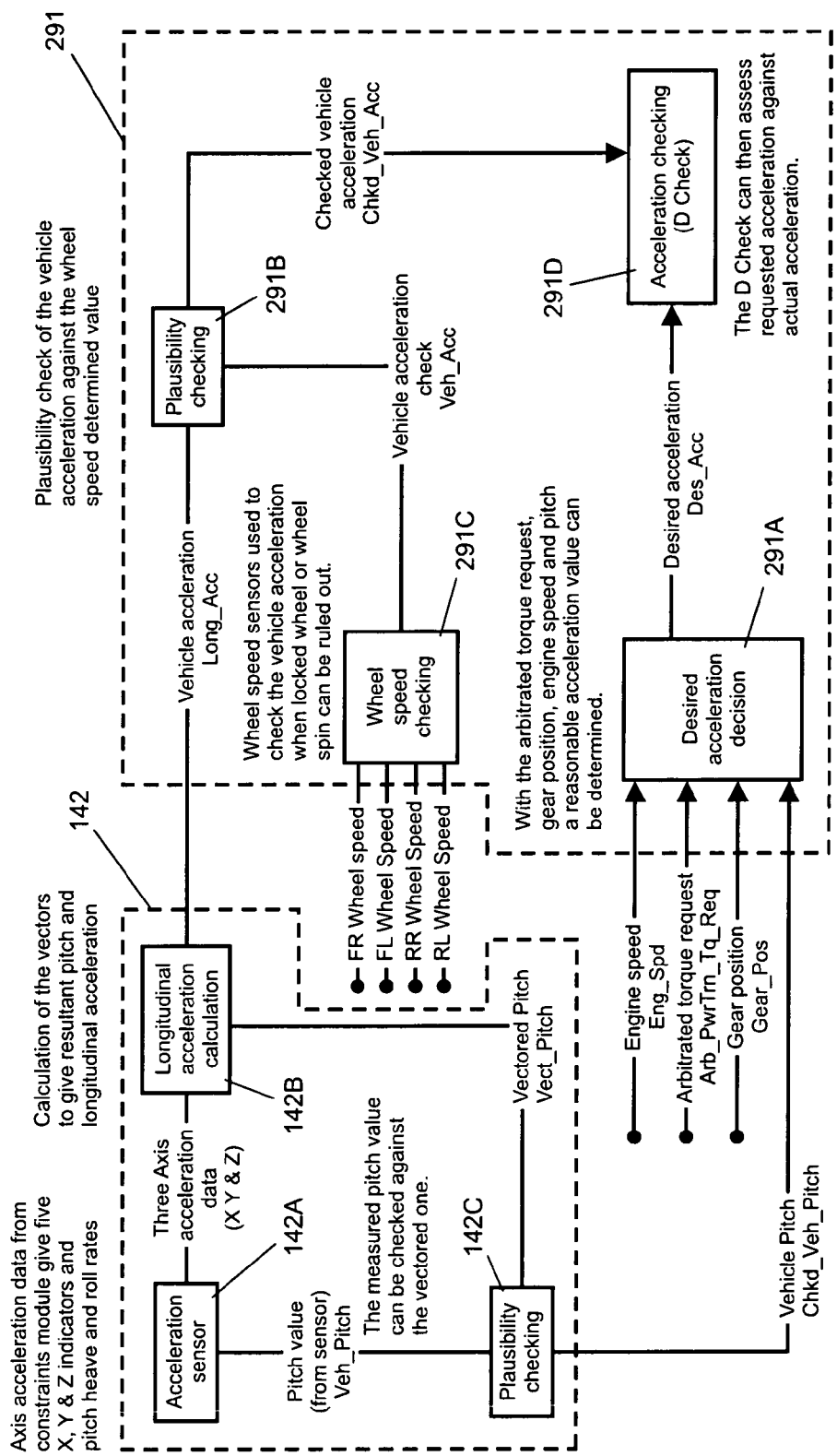
FIG. 3 is a schematic illustration of a flow of control signals in a D-Check function block of the vehicle of FIG. 1.

FIG. 3 shows in more detail a configuration of the accelerometer device 142 and the D-Check function block 291.

The accelerometer device 142 has a 6-axis acceleration sensor 142A arranged to provide an output corresponding to a rate of acceleration experienced by the device 142 along each of three orthogonal axes X, Y, Z. The sensor 142A also provides an output Veh_Pitch corresponding to the pitch angle of the vehicle relative to a reference orientation (being an orientation corresponding to a vehicle standing on a level surface). It is to be understood that the relationship between torque and vehicle response (in respect of movement) is a function of pitch.

In some embodiments, in addition or instead the sensor 142A provides an output corresponding to a rate of rotation of the sensor 142A about each axis (corresponding to a rate of roll, pitch and yaw respectively).

It is to be understood that in some embodiments an accelerometer may be employed that is not a 6-axis accelerometer. For example a 3-axis accelerometer providing values of acceleration along each of the three axes X, Y, Z may be employed.

The rate of acceleration along the X, Y and Z axes is input to a longitudinal acceleration calculation function block 142B arranged to determine (1) a resultant pitch angle ('vectored pitch') of the vehicle Vect_Pitch responsive to the rates of acceleration along each of axes X, Y, Z (i.e. acceleration vectors parallel to the respective axes) and (2) a value of longitudinal acceleration Long_Acc of the vehicle. By longitudinal acceleration is meant an actual overall acceleration of the vehicle 100 parallel to a surface over which the vehicle is driving, i.e. the value of acceleration parallel to the longitudinal axis A of the vehicle (parallel to axis X) corrected for pitch about a lateral axis L of the vehicle, L, passing through the centre of gravity COG of the vehicle 100.

The acceleration sensor 142A outputs the measured value of pitch angle Veh_Pitch to a plausibility checking function block 142C which compares the value of Veh_Pitch with the value Vect_Pitch calculated by the longitudinal acceleration calculation function block 142B. This is in order to check that the values are consistent with one another. If the values are not consistent with one another the checking function block 142C is arranged to provide an output signal corresponding to a fault code. The vehicle 100 may be configured to provide an output to the driver responsive to the fault code, for example a service request output. In some embodiments the vehicle may be configured to reconfigure one or more portions of the controller 140 responsive to the fault code.

It is to be understood that in embodiments not having a 6-axis acceleration sensor 142A arranged to output a value Veh_Pitch the function block 142C may not be provided.

The value of Veh_Pitch input to the function block 142C is output as signal Chkd_Veh_Pitch to a desired acceleration decision function block 291A of the D-Check function block 291. The decision function block 291A also receives as input signals a signal corresponding to the engine speed, Eng_Spd, the Arb_PwrTrn_Tq_Req signal and a signal corresponding to the currently selected gear ratio, Gear_Pos, being in the present example a signal corresponding to the currently selected gear. The decision function block 291A is configured to determine an estimate of the rate of acceleration desired by the driver of the vehicle responsive to the input signals. A signal Des_Acc corresponding to this estimated desired rate is output to an acceleration checking function block 291D.

It is to be understood that the decision function block 291A takes into account the value of Chkd_Veh_Pitch when calculating the value of Des_Acc so that if the vehicle 100 is on an incline, the value of desired (i.e. expected) acceleration may be corrected to take into account a positive or negative acceleration force due to gravity. Thus if the vehicle 100 is travelling forwards up a hill the value of actual acceleration for a given amount of torque supplied by the engine 121 and/or CIMG 123 may be expected to be less than if the vehicle were travelling forwards on a level surface. Similarly, if the vehicle 100 is travelling forwards down a hill the value of actual acceleration for a given torque to the wheels may be expected to be greater than if it is travelling on a level surface or up a hill.

It is to be understood that the value of Des_Acc may also take into account an actual loading on the powertrain 129 due to vehicle weight and the weight of any object being towed. The loading may be determined by the PCM 201 or any other suitable means. In some embodiments vehicle load may be calculated based on a flow rate of air or fuel into the engine 121. In some embodiments the desired acceleration decision function block 291A assumes the vehicle is operating at a prescribed (fixed) loading on the powertrain.

The value of Long_Acc calculated by the longitudinal acceleration calculation function block 142B is output to a plausibility checking function block 291B of the D-Check function block 291. The value of Long_Acc is compared by function block 291B with a vehicle acceleration value Veh_Acc determined by a wheel speed checking function block 291C. The wheel speed checking function block 291C receives as inputs a speed of each of the four wheels 111, 112, 114, 115 and determines a rate of acceleration of the vehicle 100 responsive to the measured wheel speeds.

The plausibility checking function block 291B outputs the value of Long_Acc as a checked value of vehicle acceleration Chkd_Veh_Acc to the acceleration checking function block 291D.

If the plausibility checking function block 291B determines that the value of Veh_Acc (determined responsive to wheel speeds) is not consistent with the value of Long_Acc (determined responsive to acceleration measured by acceleration sensor 142A) the function block 291B terminates checking and provides a warning signal. The function block 291B is configured to resume checking as new input data becomes available.

In some embodiments the block 291B continues to output the value Long_Acc as the parameter Chkd_Veh_Acc even if it terminates checking and provides the warning signal due to a mismatch so that the acceleration checking function block 291D can continue functioning.

The acceleration checking function block 291D compares the value of Des_Acc with the value of Chkd_Veh_Acc. If the function block 291D determines that the value of Chkd_Veh_Acc exceeds the value of Des_Acc by more than a prescribed amount the function block 291D provides an alert signal to a vehicle controller area network (CAN) bus responsive to which the amount of torque generated by the engine 121 and CIMG 123 is reduced substantially to zero. In some arrangements the transmission 124 is controlled to disconnect the engine 121 and CIMG 123 from the wheels 111, 112, 114, 115 of the vehicle 100.

Thus it is to be understood that in some embodiments the vehicle 100 is configured to respond in a relatively dramatic manner to a determination that the value of actual acceleration, Chkd_Veh_Acc is greater than the value of desired vehicle acceleration Des_Acc.

In some alternative embodiments, in the event that a discrepancy is identified in which the actual acceleration Chkd_Veh_Acc is greater than the desired value Des_Acc the vehicle 100 is configured to reduce the value of Arb_PwrTrn_Tq_Req accordingly in order to reduce the value of Chkd_Veh_Acc closer to the value of Des_Acc.

With the increase in interest in hybrid electric vehicles having a plurality of torque sources, conventional methods of checking actual torque developed by one or more prime movers of a vehicle against demanded torque are becoming increasingly complex to implement. Embodiments of the present invention enable an independent check of vehicle response to torque applied by a powertrain to wheels of a vehicle thereby to reduce a risk that a vehicle accelerates in a manner unintended by the driver. Some embodiments enable an independent check of vehicle response to torque applied by a powertrain including one or more prime movers and brakes of the vehicle to wheels of a vehicle to be made, thereby to reduce a risk that a vehicle accelerates in a manner unintended by the driver.

In some embodiments the controller 140 is operable to command the powertrain 129 to increase the amount of torque delivered to one or more wheels in the event that the measured value of longitudinal acceleration is determined to be too low for the prevailing value of Arb_PwrTrn_Tq_Reg. This feature may be particularly valuable in circumstances where a driver urgently requires powertrain torque to accelerate the vehicle, for example when accelerating at a junction or whilst overtaking another vehicle. If a fault associated with the powertrain or vehicle controller results in under-delivery of torque, the controller 140 may detect this problem and command an increase in torque delivery to one or more wheels by the powertrain 129.

Figure 4:
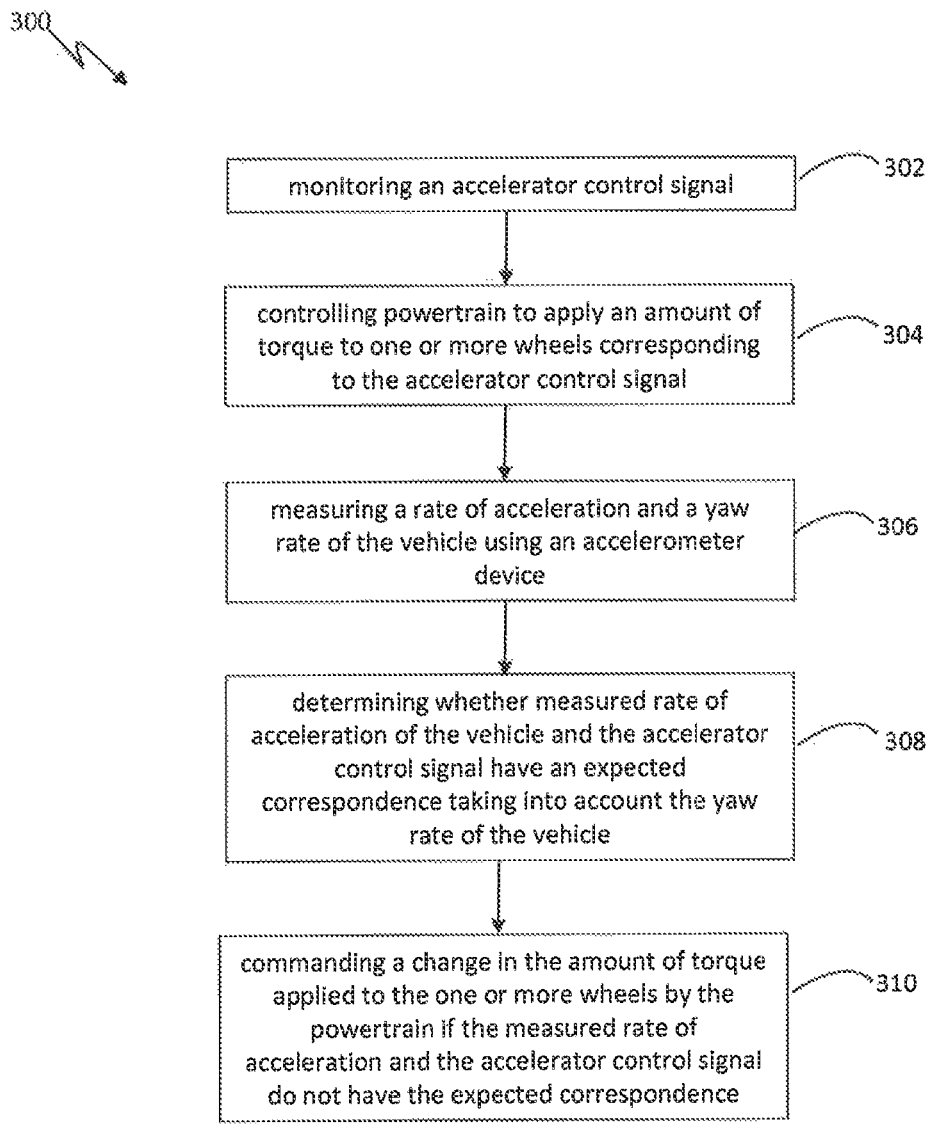
FIG. 4 is a flowchart diagram summarizing an example method designed according to an embodiment of this invention.

FIG. 4 is a flowchart diagram 300 summarizing an example control strategy. At 302, an accelerator control signal is monitored. The powertrain is controlled at 304 to apply an amount of torque to one or more wheels corresponding to the accelerator control signal. At 306, a rate of acceleration and a yaw rate of the vehicle are measured using an accelerometer device. At 308, a determination is made whether the measured rate of acceleration and the accelerator control signal have an expected correspondence taking into account the yaw rate of the vehicle. At 310, a change in the amount of torque applied to one or more wheels by the powertrain is commanded if the measured rate of acceleration and the accelerator control signal do not have the expected correspondence.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a vehicle, the system comprising:
   control means operable to monitor an accelerator control signal of the vehicle and to control a powertrain of the vehicle to apply an amount of torque to one or more wheels of the vehicle corresponding to the accelerator control signal, the powertrain comprising prime mover means;
   an accelerometer device operable to measure a rate of acceleration and a yaw rate of the vehicle; and
   means for determining whether the measured rate of acceleration of the vehicle and the accelerator control signal have an expected correspondence taking into account the yaw rate of the vehicle,
   wherein if the measured rate of acceleration and the accelerator control signal do not have the expected correspondence, the control means is operable to command a change in the amount of torque applied to the one or more wheels by the powertrain.

2. A control system as claimed in claim 1 arranged to determine the amount of torque the powertrain is to apply corresponding to the accelerator control signal further responsive to a speed of the vehicle.

3. A control system as claimed in claim 1 arranged to determine the amount of torque corresponding to the accelerator control signal further responsive to a speed of at least a portion of the powertrain, optionally a speed of the prime mover means of the powertrain.

4. A control system as claimed in claim 1, operable to change the amount of torque applied to the one or more wheels of the vehicle by commanding a change in the amount of torque developed by the prime mover means.

5. A control system as claimed in claim 1, operable to change the amount of torque applied to the one or more wheels by the powertrain by commanding a change to an amount of brake force imposed on one or more wheels.

6. A control system as claimed in claim 1, wherein if the measured rate of acceleration corresponds to a value higher than that expected for the accelerator control signal the system is operable to command a reduction in the amount of torque applied to the one or more wheels by the powertrain.

7. A control system as claimed in claim 6 operable to command a reduction in the amount of torque applied to the one or more wheels of the vehicle by commanding disconnection of the prime mover means from the one or more wheels or commanding a slip of clutch means between the prime mover means and the one or more wheels.

8. A control system as claimed in claim 6 operable to command a reduction in the amount of torque applied to one or more wheels of the vehicle by commanding the powertrain to turn off the at least one prime mover means.

9. A control system as claimed in claim 1, wherein if the measured rate of acceleration corresponds to a value lower than that expected for the value of accelerator control signal the control system is operable to command an increase in the amount of torque applied to the one or more wheels by the powertrain.

10. A control system as claimed in claim 1, wherein the prime mover means comprises a plurality of prime mover systems.

11. A control system as claimed in claim 1, wherein the measured rate of acceleration of the vehicle is provided to the control system from an external source, the external source having means for measuring rate of acceleration.

12. A control system as claimed in claim 1, wherein the measured rate of acceleration of the vehicle is a rate parallel to the direction of travel of the vehicle.

13. A control system as claimed in claim 12 operable to determine whether the accelerator control signal and the measured rate of acceleration in the direction parallel to the direction of travel have the expected correspondence by taking into account vehicle attitude.

14. A control system as claimed in claim 1, wherein the accelerator control signal is provided according to a position of one selected from amongst a driver operated foot pedal and a hand-operated control.

15. A control system as claimed in claim 1, comprising a cruise control system operable to provide the accelerator control signal.

16. A vehicle comprising a control system as claimed in claim 1.

17. A control system as claimed in claim 1, wherein the change in the amount of torque applied to the one or more wheels of the powertrain is operable to adjust the rate of acceleration of the vehicle to more closely correspond to the accelerator control signal.

18. A method of controlling a vehicle comprising:
   monitoring an accelerator control signal of the vehicle and controlling a powertrain of the vehicle having at least one prime mover to apply an amount of torque to one or more wheels of the vehicle corresponding to the accelerator control signal;
   measuring a rate of acceleration and a yaw rate of vehicle using an accelerometer device; and
   determining whether the measured rate of acceleration of the vehicle and the accelerator control signal have an expected correspondence taking into account the yaw rate of the vehicle,
   wherein if the measured rate of acceleration and the accelerator control signal do not have the expected correspondence, the method comprises commanding a change in the amount of torque applied to the one or more wheels by the powertrain.

19. A system for a vehicle, the system comprising:
a control device operable to monitor an accelerator control signal of the vehicle and to control a powertrain of the vehicle to apply an amount of torque to one or more wheels of the vehicle corresponding to the accelerator control signal, the powertrain comprising a prime mover;
an accelerometer device operable to measure a rate of acceleration and a yaw rate of the vehicle; and
a sensor for determining whether the measured rate of acceleration of the vehicle and the accelerator control signal have an expected correspondence taking into account the yaw rate of the vehicle,
wherein if the measured rate of acceleration and the accelerator control signal do not have the expected correspondence, the control device is operable to command a change in the amount of torque applied to the one or more wheels by the powertrain.

20. A control system for a vehicle, the system comprising:
control means operable to monitor an accelerator control signal of the vehicle and to control a powertrain of the vehicle to apply an amount of torque to one or more wheels of the vehicle corresponding to the accelerator control signal, the powertrain comprising prime mover means; and
means for determining whether a measured rate of acceleration of the vehicle and the accelerator control signal have an expected correspondence,
wherein if the measured rate of acceleration and the accelerator control signal do not have the expected correspondence, the control means is operable to command a change in the amount of torque applied to the one or more wheels by the powertrain,
wherein if the measured rate of acceleration corresponds to a value higher than that expected for the accelerator control signal the system is operable to command a reduction in the amount of torque applied to the one or more wheels by the powertrain.

21. A control system as claimed in claim 20 operable to command a reduction in the amount of torque applied to the one or more wheels of the vehicle by commanding disconnection of the prime mover means from the one or more wheels or commanding a slip of clutch means between the prime mover means and the one or more wheels.

* * * * *